Feb. 15, 1966 K. RÄNTSCH ETAL 3,235,220
APPARATUS FOR IMPARTING STEPWISE
MOVEMENT TO A CARRIAGE
Filed Jan. 20, 1964 3 Sheets-Sheet 1

INVENTORS
Kurt Räntsch
Erich Lepper
Otto Ambrosius
BY Singer, Stern & Carlberg
ATTORNEYS

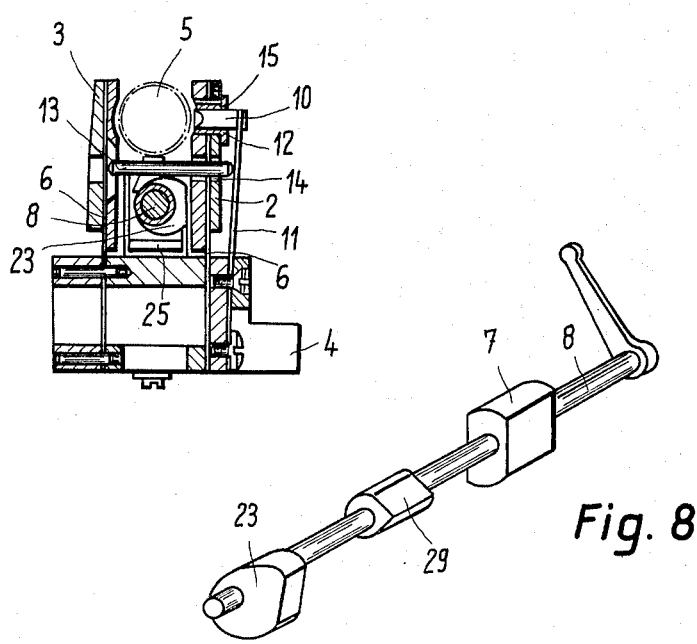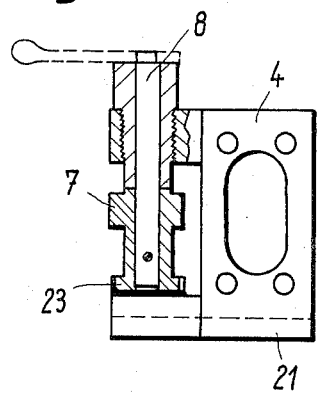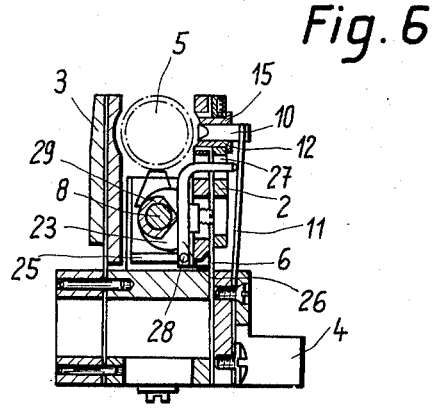

United States Patent Office 3,235,220
Patented Feb. 15, 1966

3,235,220
APPARATUS FOR IMPARTING STEPWISE
MOVEMENT TO A CARRIAGE
Kurt Räntsch, Wetzlar (Lahn), Erich Lepper, Waldgirmes, Kreis Wetzlar, and Otto Ambrosius, Oberbiel, near Wetzlar, Germany, assignors to M. Hensoldt & Sohne, Optische Werke AG, Wetzlar (Lahn), Germany
Filed Jan. 20, 1964, Ser. No. 338,707
Claims priority, application Germany, Jan. 22, 1963, H 48,022
9 Claims. (Cl. 248—346)

The present invention relates to an apparatus for the stepwise movement of a carriage, for example, the carriage of a microscope or the like. With devices of the nature referred to there is usually a carriage member that requires not only fine adjustment but which, on occasion, must be moved a substantial distance from one position to another. When the fine adjustment of the carriage is accomplished by a threaded spindle, much time can be consumed in moving the carriage any substantial distance. The present invention is particularly concerned with an arrangemnt for facilitating the rapid and the easy movement of such a carriage from one position to another while not interferring with the accuracy and convenience of the fine movement control for the carriage.

With the foregoing in mind, it is a primary object of the present invention to provide an arrangement for effecting easy stepwise adjustment of a carriage, such as a microscope carriage, without impairing the fine adjustment mechanism for the carriage.

Another object of this invention is the provision and arrangement for effecting stepwise adjustment of a carriage, such as a microscope carriage, in which the carriage can be brought to rest in an accurately located position.

The objects referred to above, as well as other objects and advantages of this invention are achieved, generally, by providing a threaded member with which the carriage is engaged and arranging the connection of the carriage to the threaded member such that the carriage can be released from the threaded member for stepwise adjustment. More specifically, the carriage is provided with nut-like means engaging a threaded spindle which nut-like means is in the form of two cheek pieces or cheek members that are threaded internally and which engage opposite sides of the threaded spindle.

The two cheek pieces are so mounted on the carriage that they can be moved away from the threaded spindle whereby the carriage can then be moved along the spindle. Movement of the cheek pieces toward and away from the spindle can be accomplished mechanically, magnetically or by other means such as mechanical levers and the like. It is preferable however to provide springs for urging the cheek pieces toward the threaded spindle.

According to one modification of the present invention, a wedge shaped pin extends through one of the cheek pieces and is biased toward the threaded spindle so that when the cheeks are closed on the spindle the pin is disengaged from the spindle threads whereas it is possible to open the cheek members and to cause the wedge shaped pin to engage the spindle threads. This provides for accurate positioning of the cheek members relative to the threads of the spindle so that proper interengagement of the threads on the cheeks with those on the spindle can be made. The spindle thread can be as fine as a one millimeter pitch so that it will be evident that proper engagement of the cheek members with the spindle is important.

In another form which the invention can take, an angular pin is provided pivoted at one end between the cheeks and which acts through one of the cheeks to control the wedge shaped pin referred to above. As a still further arrangement of the present invention, for fine adjustment of the carriage relative to the spindle within the range of the pitch of the screw threads, a wedge is provided which is movably mounted on the carriage so that the wedge can be shifted in the direction of the spindle axis a distance equal to about one spindle thread interval.

In any case, control means are provided for the selective engagement of the cheek pieces with the spindle and of the wedge shaped pin with the spindle and of the aforementioned wedge member with the spindle so that the carriage can be placed under the control of the spindle or so that the cheek pieces can be aligned with the spindle or so that the carriage can be moved stepwise and then controlled in fine adjustment by the wedge member.

The exact nature of the present invention will be more apparent upon reference to the following detailed description taken in connection with the accompanying drawings wherein:

FIGURE 4 is a sectional view indicated by line 4—4 on FIGURE 1;

FIGURE 5 is a plan sectional view showing a portion of the structure of FIGURE 1;

FIGURE 6 is a cross-sectional view similar to FIGURE 4 but showing a modified form of the invention;

FIGURE 8 is a perspective view showing the cams mounted on the supporting shaft therefor.

Figure 1:
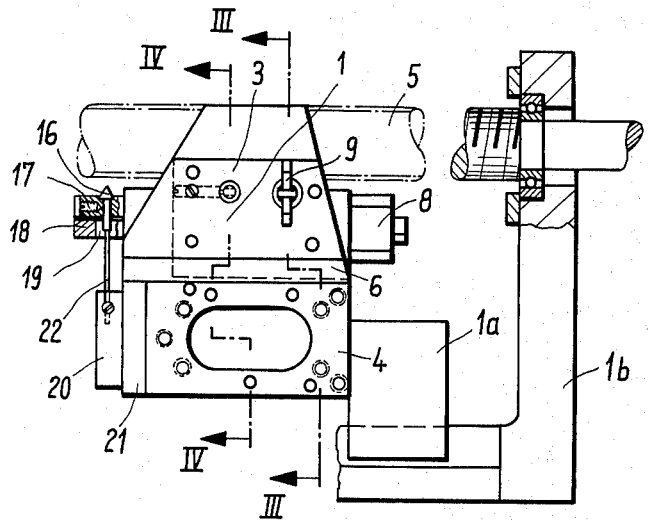
FIGURE 1 shows a front view of one form that the present invention can take.

The arrangement according to the present invention includes a member generally indicated at 1 adapted for being rigidly secured to a moveable carriage shown diagrammatically at 1a and which may be, for example, a carriage of a microscope. Member 1 comprises two cheek pieces 2 and 3 supported on a base member 4. The cheek pieces are adapted for engagement with a rotatable threaded spindle 5 which is rotatable in the support 1b of the device on which the carriage is movable. The spindle is non-axially movable on support 16. The cheek pieces have threads formed on their inside for engagement with the external threads of spindle 5.

Each cheek piece is mounted on a corresponding leaf spring 6 by means of which it is biased toward the adjacent side of spindle 5. The cheek pieces are disengageable from spindle 5 by means of a cam 7 mounted on a rotatable shaft 8. Shaft 8 is rotatable manually and upon rotation thereof the lobes of cam 7 will engage the cheek pieces and move them outwardly away from the spindle. The cheek pieces are additionally biased toward the spindle by a tension spring 9 connected therebetween.

Base member 4 has resiliently mounted thereon by leaf spring 11, a pin 10 which has a wedge shaped inner end. Pin 10 extends through hole 12 in cheek piece 2 for engagement with spindle 5. Cheek piece 3 has secured thereto a pin 13 which extends through another hole 14 in cheek piece 2 so as to engage leaf spring 11 which supports pin 10. Pin 13 is of such a length that when cheek pieces 2 and 3 are closed on the spindle, the wedge pointed pin 10 will be disengaged from the spindle threads. However, when the cheek pieces are spread apart by rotation of shaft 8 to actuate cam 7, the pin 13 will move outwardly with cheek piece 3 thereby releasing leaf spring 11 which will then be freed to urge pin 10 inwardly against the threads of the spindle. This inner movement of the pin will continue until an abutment 15 thereon engages the outer face of cheek piece 2.

The abutment 15 is so arranged that during outward movement of the cheek pieces, the cheek pieces are fully disengaged with spindle 5 before wedge pointed pin 10 engages the spindle threads. There is also a position where both the cheek pieces and the wedge pointed pin are disengaged from the spindle threads so that the carriage can be moved freely along the threads. After the carriage has been adjusted however, and the cam 7 is turned by shaft 8 back to its original position, there will be a period first of engagement of wedge pointed pin 10 with the threads of spindle 5 thereby to effect accurate alignment of the threads of the cheek pieces with the threads of the spindle and thereafter as the cheek pieces close upon the spindle the wedge pointed pin 10 will again be pushed outwardly away from the spindle by pin 13. It will be evident that the arrangement provides for selective engagement with the spindle of the cheek pieces or of the wedge pointed pin and for disengagement from the spindle of both thereof.

In the modification of FIGURE 6, wherein corresponding parts carry corresponding numbers, the pin 13 of the FIGURE 4 modification is replaced by an angularly bent pin 26 pivotally supported on base 4 by pin 28. The bent upper portion of pin 26 is arranged to pass through hole 27 in cheek piece 2 to engage leaf spring 11 pertaining to pin 10. In the modification of FIGURE 6 the rotatable shaft 8 has at one of its ends cam means with two inclined surfaces which define a cam like point 29 for engagement with pin 26 to move the pin in a direction to push leaf spring 11 away from cheek piece 2 and thereby disengage wedge pointed pin from the spindle by continued or reverse rotation of the shaft 8, pin 26 will disengage the leaf spring 11 so that the spring will be able to press wedge pointed pin 10 against the threads of the spindle.

If cheek pieces 2 and 3 are now closed, as by reverse rotation of shaft 8 and cam 7 thereon, the cam 29 will again press against pin 26 to move leaf spring 11 and pin 10 to their retracted positions. In this modification the pin 10 functions in the same manner as in connection with the previously described modification, namely, to insure correct alignment of the screw threads of the spindle with those of the cheek pieces when the cheek pieces are brought into engagement with the spindle.

Figure 2:
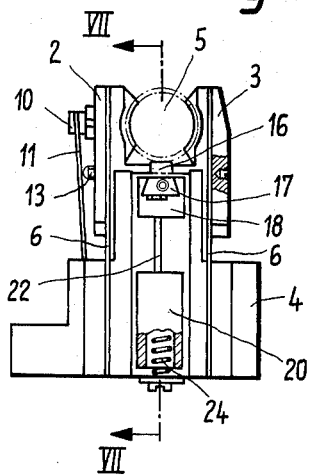
FIGURE 2 is a view looking in from the left side of FIGURE 1.
Figure 3:
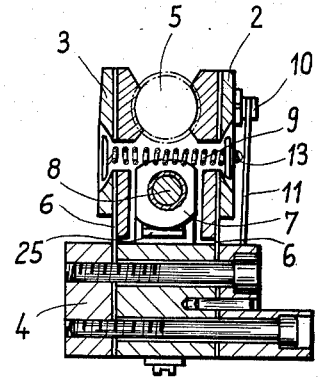
FIGURE 3 is a vertical sectional view indicated by line 3—3 on FIGURE 1.
Figure 7:
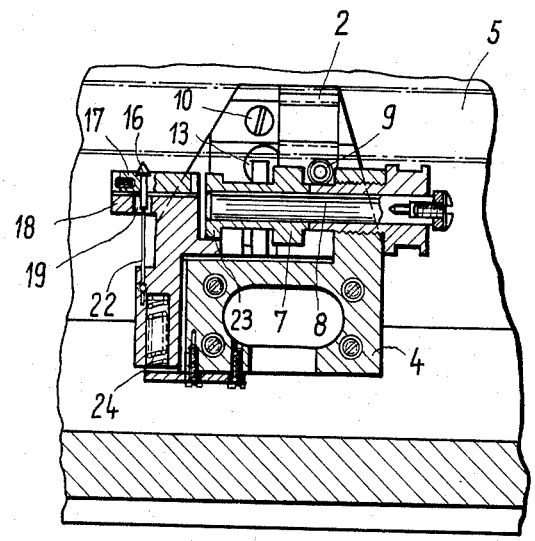
FIGURE 7 is a vertical cross section taken on line VII—VII of FIGURE 2.

Referring again to FIGURES 1, 2 and 7, it will be seen that the arrangement comprises a swallow tail slide member 17 slidable in a guideway 18 while a wedge member 16 is movable in a direction at right angles to the axis of spindle 5 in a hole in slide 17.

Guideway 18 has an opening therein of such a diameter that the wedge member 16, together with the part 17 to which it is connected, will be able to move exactly one spindle interval in either direction, namely, one millimeter when the thread of spindle 5 is of this pitch.

The wedge 16 is connected by means of a leaf spring 22 with another swallow tail slide member 20 that is slidable in a guideway 21 extending at right angles to the axis of spindle 5. An eccentric 23 is provided which will be seen in FIGURES 4 and 5 which is mounted on shaft 8 together with cam 7 and, by this means, the wedge 16 can be actuated through a pusher member 25, a spring 24 and the hole in part 17 and the spring 22 thereby to push the wedge member 16 towards spindle 5 and to bring it into engagement with the threads of the spindle 5. The eccentric 23 is of such a shape that the wedge 16 enters the threads of the spindle only when the shaft 8 is rotated in one of its two possible directions.

FIGURE 8 shows the relative positioning of cams 7, 29 and 23 on shaft 8.

The device disclosed and described operates in the following manner:

For displacing the carriage by interval multiples of the pitch of the spindle screw thread, e.g., by millimeters, the two cheek pieces 2 and 3 of member 1 are disengaged from the spindle 5 by rotation of shaft 8 and at this time pin 10 is also disengaged from the spindle and the carriage is then shifted the desired distance. The shaft 8 is at this time rotated to such a position that the wedge member 16 will also remain disengaged from the spindle threads.

After the carriage has been shifted, the shaft 8 is again rotated to put cam 7 back to its original position whereupon the wedge pointed pin will at first enter the threads of spindle 5 and give the check pieces 2 and 3 their correct alignment relative to the threads of the spindle and, thereafter, when the cheek pieces are fully closed the threads on the cheek pieces and on the spindle will come into proper enegagement. The spring 9 at this time will hold the cheek pieces firmly against the opposite sides of the spindle.

If it occurs that the carriage has not moved exactly the required number of millimeters at the time it comes to rest, then, to avoid repeated and time consuming attempts to adjust the carriage to its precise position, the wedge mmeber 16 is brought into action so as to effect a slight shifting of the carriage through the interval of one thread in one direction or the other. To accomplish this the shaft 8 is rotated in such a direction that the eccentric 23 becomes operative while at the same time the cheek members 2 and 3 are disengaged from the spindle and likewise wedge shaped pin 10 is also disengaged from the spindle.

The eccentric 23 when rotated in counter clockwise direction by shaft 8 will no longer bear down upon the pusher element 25 so that the latter will recede under the force of spring 24. At the same time spring 24, which is connected to base 4, will exert its force upon slide 20 and this will push wedge member 16 into the threads of spindle 5 and thereby hold the thread member 1 fixed to the spindle. The adjustment of slide 17 at that ime is effective for accomplishing fine adjustment of the carriage the distance of one thread interval in one direction or the other. The space around member 16 in hole 19 is so proportioned that this amount of possible movement of the carriage can be accomplished. After the adjustment of the carriage is completed as described above, the shaft 8 is turned back so that the eccentric 23 will again act on pusher 25 to compress spring 24 and thereby withdraw wedge member from the threads of the spindle. At this time the support spring 22 for member 16 will return it to its original position in the center of hole 19 of guideway 18.

For fine adjustment of the carriage within the range of one of the units of measurement as determined by the pitch of the spindle, a micrometer screw can be provided to shift the carriage relative to the spindle within this range and the screw, furthermore, can be calibrated to indicate the shifting movement by small values as, for example, by values of $1/100$ of a millimeter. Such fine adjustment can also be effected by rotation of spindle 5 with suitable fine graduations upon the actuating mechanism.

It will be understood that this invention is susceptible to modification in order to adapt it to different usages and conditions; and accordingly, it is desired to comprehend such modifications within this invention as may fall within the scope of the appended claims.

We claim:

1. In an arrangement for adjusting a carriage along a support, said support having a threaded spindle thereon, threaded cheek members on the carriage engaging the threads of the spindle on opposite sides thereof, adjustable control means engaging said check members and moveable with the carriage, said control means being operable in one position of adjustment for moving said cheek members laterally of the spindle to disengage the cheek members from the threads of the spindle, said control means being operable for permitting said cheek members to close on said spindle, yielding support means on said carriage, and a pin connected to said support means having a wedge shaped point movable into engagement with the thread of the spindle in response to operation of said means and operable to align the threads of the cheek members with the threads of said spindle.

2. In an arrangement for adjusting a carriage along a support, said support having a threaded spindle thereon, threaded cheek members on the carriage engaging the threads of the spindle on opposite sides thereof, adjustable control means engaging said cheek members and movable with the carriage, said control means being operable in one position of adjustment for moving said cheek members laterally of the spindle to disengage the cheek members from the threads of the spindle, said control means being operable in another position of adjustment for permitting said cheek members to close on said spindle, a support member on said carriage, and a pin engaged by said support, said pin being provided with a wedge shaped point moveable into engagement with the thread of the spindle in response to operation of said control means and during disengagement of the cheek members from the spindle and operable to align the threads of the cheek members with the threads of said spindle when said cheek members are moved into engagement with said threads, said pin being movable through one of said cheek members and slidably supported in an opening therein.

3. In an arrangement for adjusting a carriage along a support, said support having a threaded spindle thereon, threaded cheek members on the carriage engaging the threads of the spindle on opposite sides thereof, adjustable controls means engaging said cheek members and moveable with the carriage, said control means being operable in one position of adjustment for moving said cheek members laterally of the spindle to disengage the cheek members from the threads of the spindle, said control means being operable in another position for permitting said cheek members to close on said spindle, a flat spring member on said carriage, and a pin engaged by said spring member, said pin having a wedge shaped point moveable into engagement with the thread of the spindle in response to operation of said control means in its position during disengagement of the cheek members from the spindle and operable in its other position to align the threads of the cheek members with the threads of said spindle, said pin being movable through one of said cheek members, and said leaf spring being affixed to the carriage and supporting said pin.

4. In an arrangement for adjusting a carriage along a support, said support having a threaded spindle thereon, threaded cheek members on the carriage engaging the threads of the spindle on opposite sides thereof, adjustable control means engaging said cheek members and moveable with the carriage, said control means being operable in one position of adjustment for moving said cheek members laterally of the spindle to disengage the cheek members from the threads of the spindle, said control means being operable in another position for permitting said cheek members to close on said spindle, and a pin slidably supported by one of said cheek members having a wedge shaped point movable into engagement with the thread of the spindle in response to operation of said control means in said first mentioned position during disengagement of the cheek members from the spindle and operable to align the threads of the cheek members with the threads of said spindle when said control means is in its second mentioned position, said pin being movably supported in one of said cheek members, and leaf spring means connected to the carriage engaging said pin, a second pin connected to the other cheek member and extending through said one cheek member with its end abutting said leaf spring means and operable upon closing of said cheek members on said spindle for moving said first mentioned pin away from said spindle.

5. In an arrangement for adjusting a carriage along a support, said support having a threaded spindle thereon, threaded cheek members on the carriage engaging the threads of the spindle on opposite sides thereof, adjustable control means engaging said cheek members and moveable with the carriage, said control means being operable in one position of adjustment for moving said cheek members laterally of the spindle to disengage the cheek members from the threads of the spindle, said control means being operable in another position of adjustment for permitting said cheek members to close on said spindle, support means on said carriage, a pin carried by said support means and movably mounted in one of said cheek members, said pin having a wedge shaped point moveable into engagement with the thread of the spindle in response to operation of said control means in said first position of adjustment and during disengagement of the cheek members from the spindle and operable to align the threads of the cheek members with the threads of said spindle, said pin being movably supported in one of said cheek members, and abutment means on said pin and said one cheek member to limit the movement of the pin in the cheek member toward said spindle.

6. In an arrangement for adjusting a carriage along a support, said support having a threaded spindle thereon, threaded cheek members on the carriage engaging the threads of the spindle on opposite sides thereof, adjustable control means engaging said cheek members, said means being moveable with the carriage operable in one position of adjustment for moving said cheek members laterally of the spindle to disengage the cheek members from the threads of the spindle, spring means for yieldingly urging said cheek members toward said spindle, said control means being operable in another position of adjustment for permitting said cheek members to close on said spindle, a leaf spring, mounted on said carriage a pin engaged by said spring having a wedge shaped point moveable into engagement with the thread of the spindle in response to operation of said control means in its first named position and during disengagement of the cheek members from the spindle and operable to align the threads of the cheek members with the threads of said spindle when said control member is moved to its second named position, said pin being movably mounted in one of said cheek members, and said leaf spring means being connected to the carriage and arranged for supporting said pin, an angle shaped lever pivoted to the carriage and having an end portion engaging said leaf spring means for moving said first mentioned pin away from said spindle when said adjustable control member is in its second named position, and a cam operated by said adjustable control means for actuating said angle lever.

7. In an arrangement for adjusting a carriage along a support, said support having a threaded spindle thereon, threaded cheek members on the carriage engaging the threads of the spindle on opposite sides thereof, adjustable control means moveable with the carriage operable in one position of adjustment for engaging and moving said cheek members laterally of the spindle to disengage the cheek members from the threads of the spindle, a slide on said carriage, a wedge carried by said slide and moveable into engagement with said spindle, and adjustable control means on said carriage for moving the wedge member relative to said carriage in the direction of the axis of the spindle to shift the carriage a small distance along the spindle.

8. In an arrangement for adjusting a carriage along a support, said support having a threaded spindle thereon, threaded cheek members on the carriage engaging the threads of the spindle on opposite sides thereof, adjustable control means engaging said cheek members and moveable with the carriage operable in one position for moving said cheek members laterally of the spindle to disengage the cheek members from the threads of the spindle, a slide on said carriage, a wedge carried by said slide and moveable into engagement with said spindle, said slide being moveable in the direction of the axis of the spindle through which slide said wedge extends so movement of the slide on the base when the wedge is in engagement with the spindle will effect fine adjustment of the carriage along the spindle.

9. In an arrangement for adjusting a carriage along a support, said support having a threaded spindle thereon, threaded cheek members on the carriage engaging the threads of the spindle on opposite sides thereof, adjustable control means engageable with said cheek members and moveable with the carriage, said control means being operable in one position of adjustment for moving said cheek members laterally of the spindle to disengage the cheek members from the threads of the spindle, a slide on said carriages, a wedge carried by said slide and moveable into engagement with said spindle, said slide being moveable in the direction of the axis of the spindle through which slide said wedge extends so movement of the slide on the base when the wedge is in engagement with the spindle will effect fine adjustment of the carriage along the spindle, said wedge member being spring urged toward said spindle, and a cam operated by said adjustable control means controlling said slide and spring.

References Cited by the Examiner
UNITED STATES PATENTS

| | | | |
|---|---|---|---|
| 2,949,947 | 8/1960 | Story | 269—254 X |
| 3,162,073 | 12/1964 | Farakas | 74—424 |

CLAUDE A. LE ROY, *Primary Examiner.*

J. PETO, *Assistant Examiner.*